(12) United States Patent
Gusat et al.

(10) Patent No.: US 7,304,949 B2
(45) Date of Patent: Dec. 4, 2007

(54) SCALABLE LINK-LEVEL FLOW-CONTROL FOR A SWITCHING DEVICE

(75) Inventors: Mitch Gusat, Adliswil (CH);
Ferdinand Gramsamer, Wettswil (CH); Mark Verhappen, Zurich (CH);
Antonius Engbersen, Feusisberg (CH);
Ronald P. Luijten, Horgen (CH);
Francois G. Abel, Rueschlikon (CH);
Cyriel Minkenberg, Adliswil (CH);
Jose Duato, Valencia (ES)

(73) Assignee: International Business Machines Corporation, Armonk, NY (US)

( * ) Notice: Subject to any disclaimer, the term of this patent is extended or adjusted under 35 U.S.C. 154(b) by 1038 days.

(21) Appl. No.: 10/357,534

(22) Filed: Feb. 3, 2003

(65) Prior Publication Data

US 2003/0152091 A1    Aug. 14, 2003

(30) Foreign Application Priority Data

Feb. 1, 2002    (EP)    .................................. 02002444

(51) Int. Cl.
*G01R 31/08*    (2006.01)
*H04J 1/16*    (2006.01)
*H04L 1/00*    (2006.01)

(52) U.S. Cl. .................... 370/231; 370/230; 370/230.1; 370/232; 370/235; 370/352; 370/353; 370/354; 370/355; 370/356

(58) Field of Classification Search ...................... None
See application file for complete search history.

(56) References Cited

U.S. PATENT DOCUMENTS 7,023,857  B1 *    4/2006    Chiussi et al. ........... 370/395.4
2002/0044546  A1 *    4/2002    Magill et al. ................ 370/352

OTHER PUBLICATIONS

G. Kornaros et al. "Implementation of ATLAS I: a Single-Chip ATM Switch with Backpressure" in Proc. IEEE Hot Interconnects VI Symposium, Stanford, California, USA Aug. 13-15, 1998, pp. 85-96.
C. Minkenberg and T. Engbersen, "A Combined Input- and Output-Queued Packet-Switch System Based on PRIZMA Switch-on-a-Chip Technology" by in IEEE Commun. Mag., vol. 38, No. 12, Dec. 2000, pp. 70-77.

* cited by examiner

*Primary Examiner*—Raj K Jain
(74) *Attorney, Agent, or Firm*—Harrington & Smith, PC

(57) ABSTRACT

The present invention discloses a scalable flow-control mechanism. In accordance with the present invention, there is provided a switching device for transporting packets of data, the packets being received at the switching device based on flow-control information, the device comprising a memory for storing the packets, a credit counter coupled to the memory for counting a credit number of packets departing from the memory, and a scheduler unit coupled to the credit counter for deriving the flow-control information in response to the credit number. Moreover, a switching apparatus and a method for generating flow-control information is disclosed.

17 Claims, 4 Drawing Sheets

SCALABLE LINK-LEVEL FLOW-CONTROL FOR A SWITCHING DEVICE

TECHNICAL FIELD

The present invention relates to a switching device for transporting packets of data, particularly for IP (Internet Protocol), ATM (Asynchronous Transfer Mode), parallel interconnects, and SAN (System and Storage Area Network), e.g. IBA (Infiniband Architecture). More particularly the invention relates to a switching device that receives packets based on flow-control information. Further, the invention relates to a method for generating the flow-control information. The invention is also related to a switching apparatus comprising one or more switching devices and a communication device.

BACKGROUND OF THE INVENTION

The unbroken popularity of the World Wide Web and its annual increase in size requires increasingly larger switching fabrics. To meet today's switching requirement of 1 Tb/s throughput and above, switches are growing not only in terms of port speed, but also in number of ports. With 5 Gb/s links, port sizes of 64, and today's link and fabrication technologies, multichip and even multishelf solutions are necessary. As a consequence, the input adapters with virtual output queuing (VOQ) are at a distance from the switching device such that the roundtrip time (RTT) bandwidth product is significantly greater than 1. On the other hand switch packet sizes in terms of bytes remain constant. This means that there are more packets on the link, which requires larger memories in the switch, for it to be able to accept all packets in transit. This is a necessity in order that the switch be work-conserving or loss-less, depending on the link-level flow-control scheme used.

A large amount of the expenses invested in switch design goes into link technology, i.e. links, cables, and connectors. Therefore bandwidth is expensive, but however the bandwidth is not used efficiently at present.

IBM's PRIZMA switch-chip family uses a grant flow-control scheme that returns to each input adapter a vector of stop and go signals per output. This scheme is described in the publication "A Combined Input- and Output-Queued Packet-Switch System Based on PRIZMA Switch-on-a-Chip Technology" by C. Minkenberg and T. Engbersen in IEEE Commun. Mag., vol. 38, no. 12, December 2000, pp. 70-77. For fabric sizes of N=64 for instance, with N the number of switch ports, a vector length and hence a flow control bandwidth of 8 bytes per packet cycle would be required. If there are not potentially complex optimization schemes applied, the grant flow-control scheme will prevent switches to grow to larger sizes.

The Atlas switch as described by G. Kornaros et al. in the publication "Implementation of ATLAS I: a Single-Chip ATM Switch with Backpressure" in Proc. IEEE Hot Interconnects VI Symposium, Stanford, Calif., USA, 13-15, Aug. 1998, pp. 85-96 represents the category of switches that use a flow-control scheme based on credits. The flow-control bandwidth is designed to return two credits per packet cycle. The storage, serialization, and return of credits is performed per input using a so-called credit-out FIFO (first-in first-out memory). The FIFO must be large enough to hold all credits that are allowed in the worst case to circulate per adapter/switch input pair. For reasons of correctness the FIFO size scales with the number of ports and the memory size assigned per switch input/output pair. Therefore, the FIFO size roughly scales with O(MN), where M signifies the assigned memory size per memory point, and N the number of switch ports. More importantly, each FIFO must provide N write accesses per packet cycle, because each switch row can have up to N parallel departures. For $N \geq 16$ this presents tough hardware design challenges. For ever larger switches it is nearly an impossible task. Therefore the FIFO concept for storage and serialization is not a scalable solution.

Further problems arise from the limited bandwidth of the in-band flow-control channel. An out-of-band flow-control is prohibitively expensive for terabit and betabit solutions. Flow-control bandwidth becomes a real bottleneck if one scales existing switches to ever larger sizes realized as single or multistage fabrics. Furthermore, for scalable multistage fabrics, there are severe restrictions that enforce a number of flow-control events per packet-cycle in the channel.

From the above follows that there is still a need in the art for a new kind of flow-control mechanism which is performant, efficient, robust, scalable, and has the potential to be used in future switching fabrics. The mechanism should be suitable for various switch environments such as communication systems and multiprocessor interconnects. It is therefore an object of the present invention to provide an improved flow-control mechanism for high and efficient packet throughput.

SUMMARY AND ADVANTAGES OF THE INVENTION

In accordance with the present invention, there is provided a switching device for transporting packets of data, the packets being received at the switching device based on flow-control information, the device comprising a memory for storing the packets, a credit counter coupled to the memory for counting a credit number of packets departing from the memory, and a scheduler unit coupled to the credit counter for deriving the flow-control information in response to the credit number.

In a second aspect, there is provided a switching device for transporting packets of data, the packets being received at the switching device based on flow-control information, the device comprising a memory for storing the packets, a credit counter coupled to the memory for counting a credit number of packets departing from the memory, an occupancy counter coupled to the memory for determining a packet occupancy level of the memory, and a scheduler unit coupled to the credit counter for deriving the flow-control information in response to the credit number and the packet occupancy level. The credit counter and the occupancy counter can be combined into one counter unit leading to a reduced chip size.

In general, a scalable flow-control mechanism can be achieved that driven by hardware limits future switching requirements to be applied between switching devices and adapters. In more detail, a credit-based flow-control mechanism with a flow-control link capacity of one so-called credit is proposed. The flow-control information comprising the credit is generated by the scheduler unit and sent to an adapter unit, also referred as to input adapter. As credit is contemplated the coding of an address or destination of a memory, e.g. a crosspoint memory. The scheduler unit within the switching device is able to prioritize the credits to be sent to the input adapter. The switching device is scalable to larger fabric sizes, because it is based on independent counters, rather than on a FIFO that performs N parallel writes and one read. The scheduler unit is also referred to as reception scheduler, because under high network loads, it schedules packets from the reception side.

Several reception scheduling strategies can be applied in order to use the switching device at its best performance. Depending on the size, the strategy can be selected. For example, enhanced performance can be achieved with a strategy that supports the forward progress of packets at the switch level, and therefore keeps switching device utilization low.

The memory within the switching device can comprise memory units, e.g. crosspoint units, which form a switch row. Those defined memory units allow partitioning per input and per output of the switching device. This provides decoupling of input- and output work-conservingness functions. Each memory unit within the switch row is connected to the scheduler unit. Such a structure has the advantage that a centralized arbitor can be avoided.

The scheduler unit may comprise a credit-number-determination unit for determining the credit number of each memory unit within the switch row. The scheduler unit may further comprise an occupancy-determination unit for determining the packet occupancy level of each memory unit within the switch row. One of the mentioned determination units or the combination of both determination units allows a pre-ordering of return credits for the generation of the flow-control information. As the flow-control information comprising the return credit is sent serially, the order of return credits can be determined in advance.

The scheduler unit can comprise reception means for receiving communication-device-input information which indicates a communication-device status. Based on the communication-device status, the decision about which return packet is sent first can be based. This allows to consider the status of the communication-device at the switching device in order to guarantee a continuous packet flow. The communication-device can be any device, e.g. an input adapter, a switch, or an upstream node.

The scheduler unit can further comprise a logic unit for determining the memory unit to which a further packet may be directed based on the determined credit numbers, the packet occupancy levels, and the communication-device-input information. The communication-device status reflects the status of virtual output queues (VOQ), for example, at an input adapter. The communication-device-input information can be used as a filtering mask in the logic unit to define a final-ordering of credits in the generation process of the flow-control information. The scheduler unit can also work with vacancy levels which depends on the definition.

A plurality of the switch rows can form a switch matrix and each switch row is assigned to one scheduler unit. This leads to a simple structure and allows a scalable design, in particular of larger switch fabric or even multistage fabrics.

A switching apparatus comprises the switching device and the adapter unit. The adapter unit is connected to the switching device via known connecting means. Usually long links between the adapter unit and the switching device are no rarity.

In another aspect of the present invention, there is provided a method for generating flow-control information in a switching apparatus. The method comprising the steps of storing packets of data in a memory that comprises memory units, counting a counter-value of packets leaving the memory, and deriving the flow-control information in response to the number of stored packets and the counter-value.

In one embodiment, the counter-value of the counter is incremented when one packet leaves the corresponding memory unit. The counter-value is decremented when one flow-control information is sent out. Thus, each counter performs as a kind of bookkeeper for its corresponding memory unit. The counter-value can be used as an indication of available credits.

It is easy to implement when one flow-control information within one packet is sent to the adapter unit.

Various other objects, features, and attendant advantages of the present invention will become more fully appreciated as the same becomes better understood when considered in conjunction with the accompanying drawings, in which like reference characters designate the same or similar parts throughout the several views.

DESCRIPTION OF THE DRAWINGS

Preferred embodiments of the invention are described in detail below, by way of example only, with reference to the following schematic drawings.

The drawings are provided for illustrative purpose only and do not necessarily represent practical examples of the present invention to scale.

DETAILED DESCRIPTION OF THE INVENTION

In the following the embodiments of the invention are addressed. The number of modules and units is chosen for sake of example only and can be varied without leaving the scope of the invention. For sake of clarity in FIGS. 1 and 2 for a number of identical units arranged in parallel only some of these units are depicted.

Figure 1:
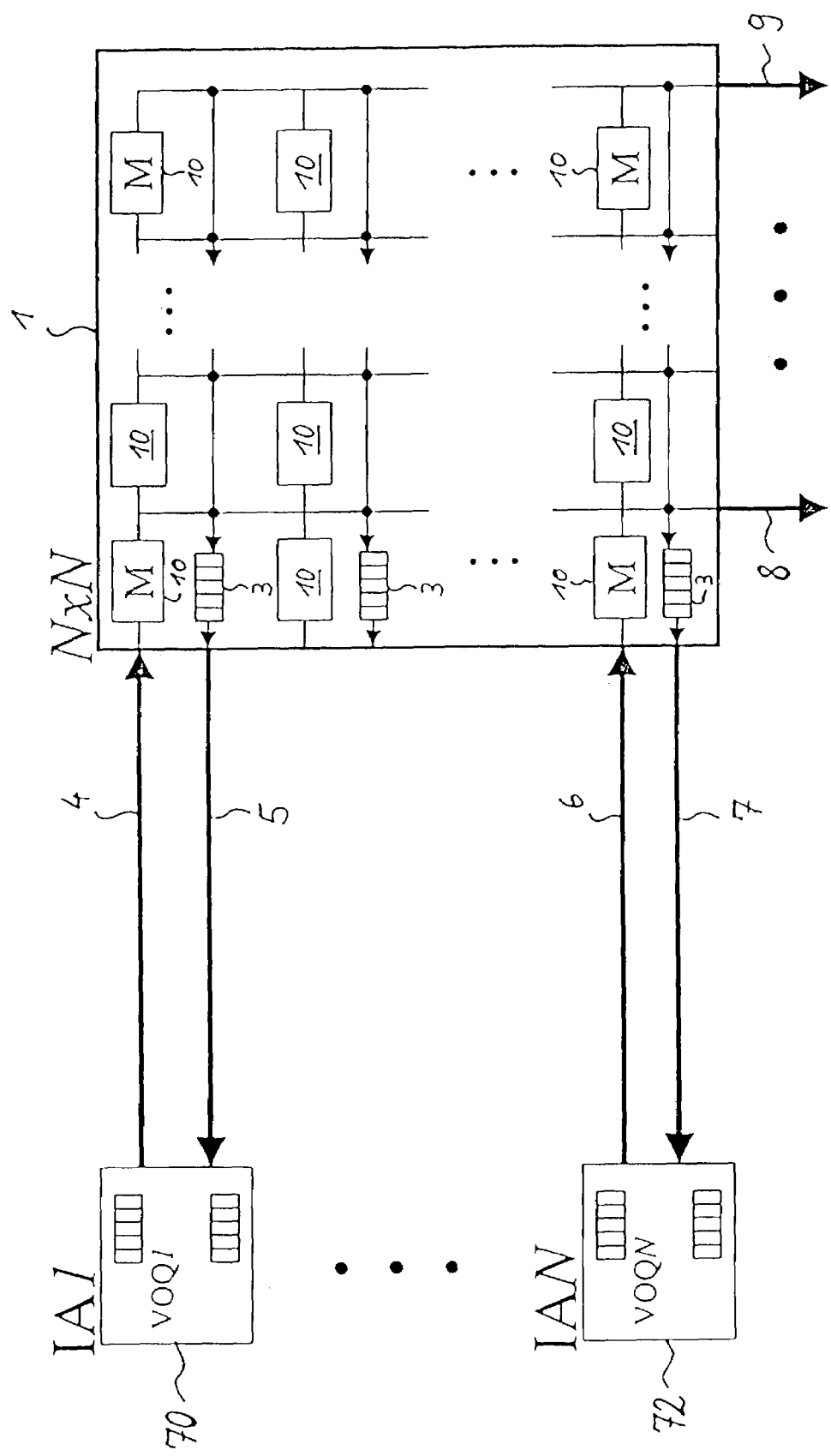
FIG. 1 shows a schematic illustration of a switch arrangement according to the state of the art.

Before embodiments of the present invention are described, a schematic illustration of a switch arrangement of the state of the art is addressed. FIG. 1 shows a switching device 1 that is connected via connecting means 4, 5, 6, 7 and switching device outputs 8, 9 to a communication unit 70, 72, hereafter referred to as adapter unit 70, 72. Each adapter unit 70, 72 comprises virtual output queues (VOQN), as indicated in the boxes labeled with 70, 72. The switching device 1 has a memory that here comprises memory units 10, also labeled with M. The memory is assumed as a shared memory with the defined memory units 10. These memory units 10 are arranged within a matrix structure, forming rows and columns. The input of each memory unit 10 is connected to its respective adapter unit 70, 72. The output of each memory unit 10 leads column wise to respective switching device outputs 8, 9. As the figure is a schematic illustration only, it is understood that in practice the switching device outputs 8, 9 are connected to the respective adapter units 70, 72 or that the switching device outputs 8, 9 are identical to the reverse channel of the connecting means 5, 7. Each row of memory units 10 and in particular each memory unit 10 within the row is connected to a FIFO (first-in first-out memory) 3, also referred to as credit-out FIFO 3, for buffering credits. The memory size numbers are equivalent to the number of credits available per input/output pair at initialization. Packets arrive via a data channel of the connecting means 4, 6 after RTT/2, i.e. half roundtrip time, at the switching device 1 and are stored in the memory unit 10 identified by its destination address. Once the packet has been scheduled for departure and has left the switching device 1, a memory address is freed and stored as a credit in the respective credit-out FIFO 3. It takes another RTT/2 until it arrives at the corresponding VOQ of the respective adapter unit 70, 72. A credit is the coding of the address of the respective memory unit 10. The shown structure has the disadvantage that it is not scalable. At the observation level, it can not be determined from which memory units 10 the credits originate.

The same reference numbers or signs are used to denote the same or like elements.

Figure 2:
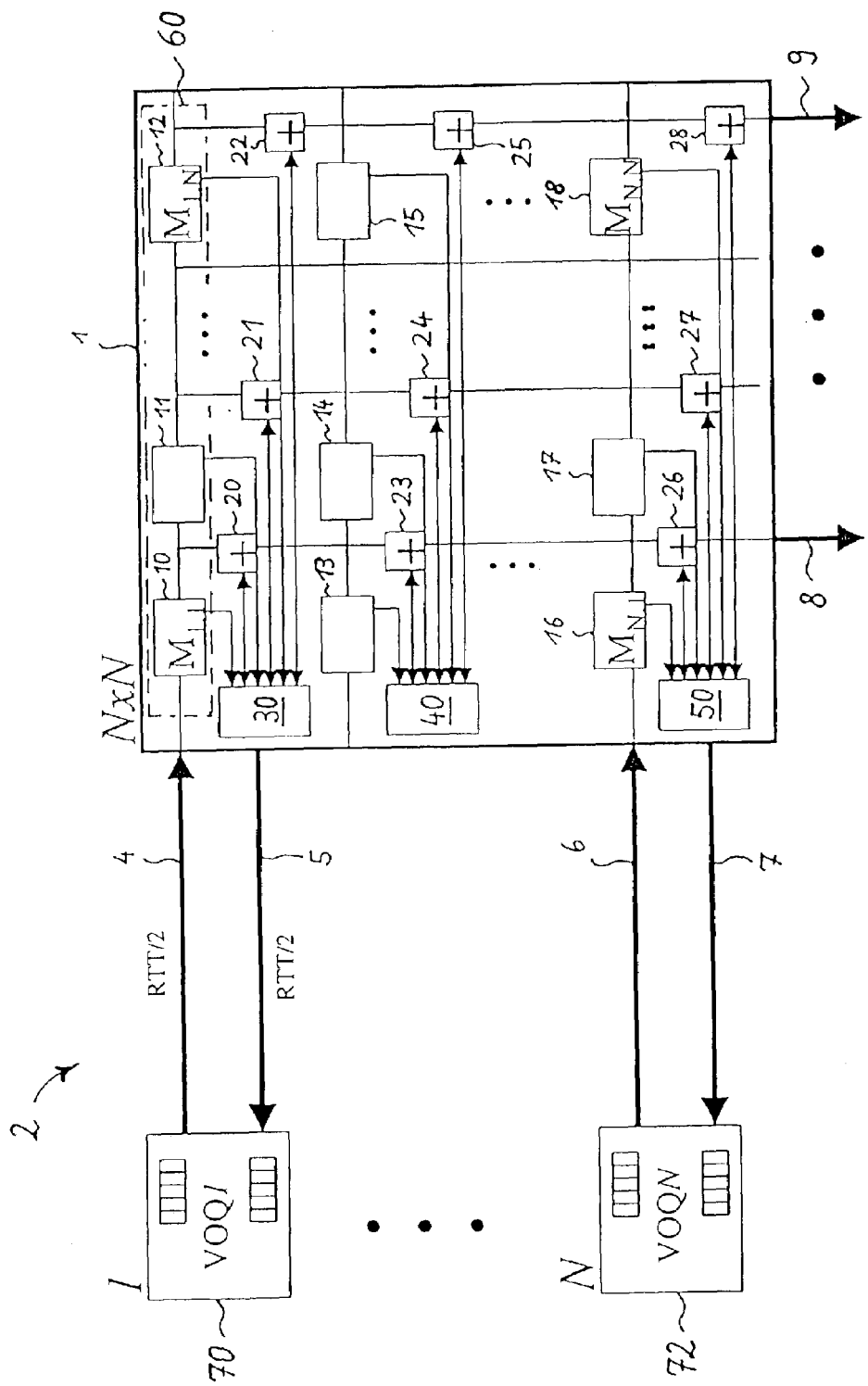
FIG. 2 shows a schematic illustration of a switching apparatus with a switching device according to the present invention.

FIG. 2 shows a schematic illustration of a switching apparatus 2 according to the present invention. The switching apparatus 2 comprises the illustrated switching device 1 and the adapter unit 70, 72. The switching device 1 comprises here crosspoint memory units 10, 11, 12, 13, 14, 15, 16, 17, 18, hereafter short memory units 10-18. These memory units 10-18 are arranged within a matrix structure, forming rows and columns. The output of each memory unit 10-18 leads column wise to the respective switching device outputs 8, 9. Several memory units 10-12 form a switch row 60. For the sake of simplicity only one switch row is indicated in the figure by reference number 60. For practical purposes, one adapter unit 70 is assigned to a defined switch row 60. Each memory unit 10-12, 13-15, 16-18 within its switch row 60 is connected to a scheduler unit 30, 40, 50, also referred to as reception scheduler. In general, each scheduler unit 30, 40, 50 per switch row implements a strategy of returning credits to the respective adapter unit 70, 72. Moreover, to each memory unit 10-18 is arranged a credit counter 20-28, i.e. each memory unit 10-12, 13-15, 16-18 has its assigned credit counter 20-22, 23-25, 26-28. Each credit counter 20-28 counts a credit number indicating the number of available credits. For example, the credit number is incremented (add operation) when one packet leaves the memory unit 10-18. On the other hand, the credit number is decremented (subtract operation) when one flow-control information comprising the credit is sent out via the reverse channel to the adapter unit 70, 72. The credit counters 20-22, 23-25, 26-28 belonging to the respective memory unit 10-12, 13-15, 16-18 within the switch row 60 are connected to the respective scheduler unit 30, 40, 50.

The generation of the flow-control information is performed by the scheduler unit 30, 40, 50 in response to the credit number. The decision is based on local, i.e. per memory unit information. The decision of which credit to prefer, i.e. which credit should be returned, can further be based on memory occupancy level, on memory vacancy level, departure rate, arrival rate, and the total number of credits to be returned.

Figure 3:
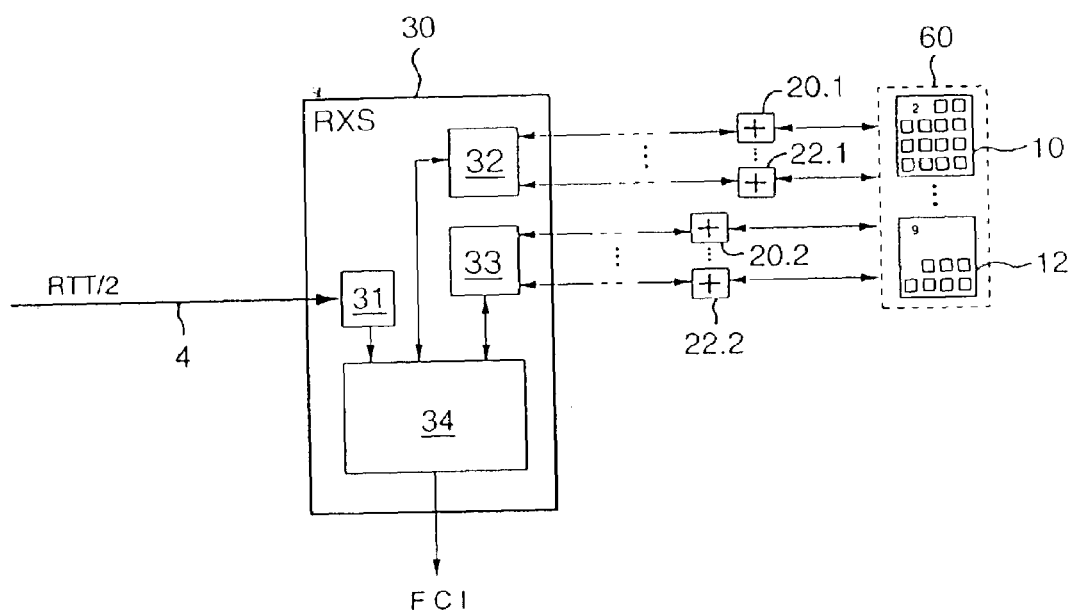
FIG. 3 shows a schematic illustration of a scheduling unit according to the present invention.

FIG. 3 shows a schematic illustration of the scheduling unit 30 according to the present invention. The task of the scheduling unit 30 is to prioritize available credits and to sent flow-control information comprising the prioritized credit to the adapter unit 70 (not shown in this figure). The scheduling unit 30 comprises here a credit-number-determination unit 32, an occupancy-determination unit 33, and a logic unit 34. Further, the scheduling unit 30 comprises a reception means 31 that receives and provides communication-device-input information. The logic unit 34 is coupled to the reception means 31, the credit-number-determination unit 32, and the occupancy-determination unit 33. The credit-number-determination unit 32 is connected to credit counters 20.1-22.1 which are further connected to the switch row 60 containing the memory units 10-12. Each credit counter 20.1-22.1 has its assigned memory unit 10-12. Moreover, the occupancy-determination unit 33 is connected to occupancy counters 20.2-22.2 which are further connected to the switch row 60. Each occupancy counter 20.2-22.2 has its assigned memory unit 10-12. The logic unit 34 outputs the generated flow-control information labeled with F C I. As the scheduling unit 30 receives the communication-device-input information via the data channel of the connecting means 4, this communication-device-input information indicating the status of the communication device can therefore be provided to the scheduling unit 30, in particular to the logic unit 34, for the decision process. The communication-device-input information can be used as a hint to schedule the return credits accordingly. The consideration of such scheduling hints leads to an enhanced performance of the switching apparatus 2. For the decision, the credit counters 20.1-22.1 are considered by the logic unit 34 as indicated by arrows from the respective credit counters 20.1-22.1. The occupancy-determination unit 33 determines the packet occupancy level of each memory unit 10-12 within the switch row 60. In the present example, the packet occupancy level of one memory unit 10 is "2" and of another memory unit 12 the occupancy level is "9". These packet occupancy levels are stored in the occupancy counters 20.2-22.2 and are retrieved from each occupancy counter 20.2-22.2 as indicated by the interrupted arrows. The scheduler unit 30 determines the memory unit 10-12 within the switch row 60 to which a further packet may be directed. In the example, the decision is based on the determined credit numbers provided by the respective credit counters 20.1-22.2 and the packet occupancy levels, e.g. "2"-"9". In a further example, the received communication-device-input information from the adapter unit 70 is used for the decision process. In general, each measure, i.e. the credit number, the packet occupancy level, the communication-device-input information, and a combination thereof can be used to derive the flow-control information. The communication-device-input information can comprise the virtual output queue (VOQN) which has received many packets and wants to send these packets next to the switching device 1. As there can be a round robin mechanism implemented in the adapter unit 70 also the round status can be contained in the communication-device-input information. A more detailed evaluation and decision process as performed by the scheduling unit 30 is described with reference to FIG. 4

Figure 4:
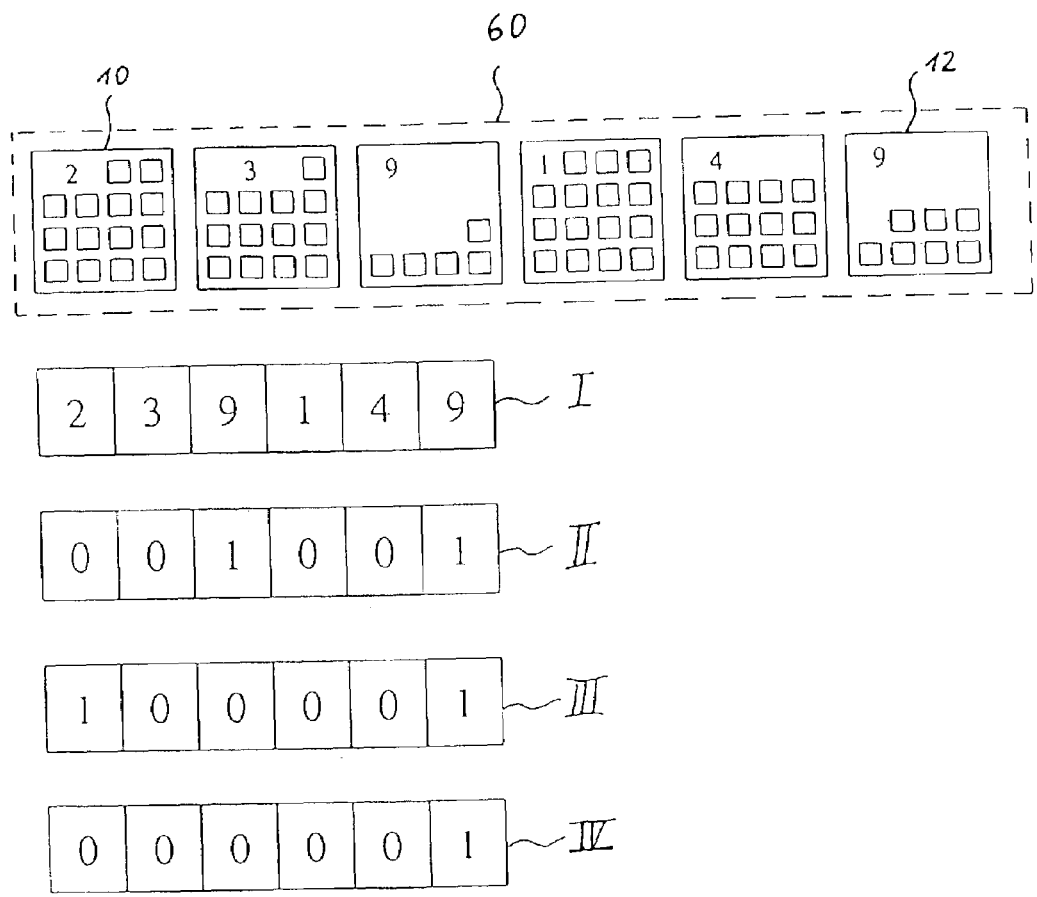
FIG. 4 shows an embodiment for the evaluation of a flow-control information.

FIG. 4 shows an embodiment for the evaluation of a flow-control information. There are various ways and strategies to prioritize credits. Two strategies to prioritize credits based on static properties are described below.

FIG. 4 indicates the switch row 60 with several memory units 10-12. The memory occupancy levels of the memory units 10-12 as shown in the figure are as follows: "2", "3", "9", "1", "4", and "9." In a first step, the occupancy levels are read by the occupancy-determination unit 33 and written, for example, into a register labeled with I. In a second step, the memory units 10-12 having the lowest occupancy level are marked by a logic "1". The respective register is labeled with II. Another register labeled with III reflects the received communication-device-input information indicating that the first and the last virtual output queue of the adapter unit 70 have a need to send the next packets. The next step, is performed by the logic unit 34. A simple logical AND operation of the content of the registers II and III leads to the result as shown in a result register IV. The result shows that a future packet can be sent to the determined memory unit that here is labeled with reference number 12 as it has one of the lowest occupancy levels and the corresponding virtual output queue is prepared to send a further packet to this determined memory unit 12. The information of the result register IV is sent as flow-control information to the adapter unit 70.

In a further example the scheduling decision is based solely on the memory occupancy level. Each switch row 60 with its scheduling unit 60 runs independently from the others. The counters 20-22, 23-25, 26-28 that do the bookkeeping per memory unit 10-12, 13-15, 16-18 are incremented whenever a packet leaves the switching device 1. The same counters 20-22, 23-25, 26-28 are decremented whenever one of its local credits is scheduled on the reverse channel via the connecting means 5, 7, 8, 9. An ideal prioritization scheme would schedule credits such that they arrive at the virtual output queue (VOQ) of the adapter unit 70, 72 when a packet stream comes alive or continues to send. It should cease to deliver credits if there are no packets to send. On the other hand, packets should preferably be sent to the switching device 1 if it is ensured that they will make forward progress.

The two strategies to prioritize credits are described in the following.

The first strategy, called highest memory occupancy first (HMF), focuses on the first aspect, namely to keep existing flows alive. The second strategy, called highest memory vacancy first (HVF), focuses on the second aspect, namely to support flows that make forward progress at switch level. The names are chosen to reflect the fact hat the decision of returning credits is taken from the occupancy level of each memory unit 10-18. The names do not reflect queue levels, because queues typically implement quality of service disciplines such as priorities.

HMF endeavors to deliver credits as fast as possible to these virtual output queues (VOQ) of the adapter unit 70, 72 which are soon to suffer credit underrun. The reasoning is that those memory units 10-18 that have the highest occupancy also tie up most of the local credits materialized as packets in their crosspoint memories, i.e. in their memory units 10-18. Therefore, their corresponding VOQs are likely to experience credit underrun. Hence, the HMF strategy favors the return of those local credits, whose memory unit 10-18 has the highest memory occupancy. There can be built into the scheme an implicit round-robin to provide fairness in the case of equal memory occupancy. The strategy tries to reduce the waiting time of newly born flows at the input side.

HVF endeavors to return local credits from those memory units 10-18 first that are close to data underrun. The reasoning is from a switch perspective, which strives for optimal performance to fill its memory equally. The memory units 10-18 that have a high occupancy level are likely to maintain a certain departure rate if an output scheduler allows it. Therefore, the return of these credits is not a priority. However, memory units 10-18 that have a low memory pressure should urgently return their credits because a certain output rate may not be maintainable. Moreover, memory units 10-18 that have lower occupancy are more likely to make forward progress. Therefore, the current forward progress of packets should be supported, meaning that these credits should be returned with priority.

Any disclosed embodiment may be combined with one or several of the other embodiments shown and/or described. This is also possible for one or more features of the embodiments.

It is to be understood that the provided illustrative examples are by no means exhaustive of the many possible uses for my invention.

From the foregoing description, one skilled in the art can easily ascertain the essential characteristics of this invention and, without departing from the spirit and scope thereof, can make various changes and modifications of the invention to adapt it to various usages and conditions.

It is to be understood that the present invention is not limited to the sole embodiment described above, but encompasses any and all embodiments within the scope of the following claims:

The invention claimed is:

1. A switching device for transporting packets of data, the packets being received at the switching device based on flow-control information, the device comprising a memory for storing the packets, a credit counter coupled to the memory for counting a credit number of packets departing from the memory, and a scheduler unit coupled to the credit counter for deriving the flow-control information in response to the credit number, where the memory is comprised of an N times M number of memory units arranged in an N switch row by M switch column matrix, where at least M is greater than one, where there are N times M credit counters individual ones of which are associated with an individual one of the N times M number of memory units, where the scheduler unit is comprised of N schedulers one for each of the N switch rows of memory units and coupled to each of M credit counters within the associated switch row of memory units, and where the flow-control information comprises N flow control signals individual ones of which are configured to specify for the storage of data one of the M memory units of an associated switch row of memory units.

2. The switching device according to claim 1, further comprising an occupancy counter coupled to the memory for determining a packet occupancy level of the memory, where the packet occupancy level is usable by the scheduler unit for deriving the flow-control information in response to the credit number and the packet occupancy level.

3. The switching device according to claim 1, wherein the scheduler unit comprises a credit-number-determination unit for determining the credit number of each memory unit within the switch row.

4. The switching device according to claim 3, wherein the scheduler unit comprises an occupancy-determination unit for assessing the packet occupancy level of each memory unit within the switch row and further comprises reception means for receiving communication-device-input information which indicates a communication-device status, and wherein the scheduler unit further comprises a logic unit for determining the memory unit to which a further packet may be directed based on the determined credit numbers, the packet occupancy levels, and the communication-device-input information.

5. The switching device according to claim 1, wherein the scheduler unit comprises an occupancy-determination unit for assessing the packet occupancy level of each memory unit within the switch row.

6. The switching device according to claim 1, wherein the scheduler unit further comprises reception means for receiving communication-device-input information which indicates a communication-device status.

7. Switching apparatus comprising the switching device according to claim 1 and a communication device connected to the switching device.

8. A method for generating flow-control information comprising the steps of: storing packing of data in a memory that comprises memory unit, counting a credit number of packets departing from the memory, and deriving the flow-control information in response to the credit number, where the memory is comprised of an N times M number of memory units arranged in an N switch row by M switch column matrix, where at least M is greater than one, where there are N times M credit counters individual ones of which are associated with an individual one of the N times M number of memory units, where the scheduler unit is comprised of N schedulers one for each of the N switch rows of memory units and coupled to each of M credit counters within the associated switch row of memory units, and where the flow-control information comprises N flow control signals individual ones of which are configured to specify for the storage of data one of the M memory units of an associated switch row of memory units.

9. The method according to claim 8, further comprises determining a packet occupancy level of the memory and using the packet occupancy level in the step of deriving the flow-control information.

10. The method according to claim 9, further comprises determining the packet occupancy level and the credit number of a plurality of the memory units.

11. The method according to claim 8, further comprises receiving from a communication device communication-device-input information that indicates a communication-device status.

12. The method according to claim 11, wherein the communication-device-input information is used in the step of deriving the flow-control information.

13. The method according to claim 8, further comprising:
determining a packet occupancy level of the memory;
receiving from a communication device communication-device-input information that indecates a communication-device status; and
wherein the step of deriving the flow-control information further comprising determining a memory unit to which a further packet may be directed based on the determined packet occupancy level, the credit number, and the communication-device-input information.

14. The method according to claim 8, further comprising prioritizing credits using a highest memory occupancy first (HMF) procedure intended to maintain as active existing flows.

15. The method according to claim 8, further comprising prioritizing credits using a highest memory vacancy first (HYF) procedure intended to support flows that make forward progress at the switch level.

16. A switching device, comprising:
an input for receiving a flow of data packets, the data packets being received based on flow control information; and
a memory for storing received data packets, the memory comprised of at least one row of individually addressable memory units, each memory unit having associated therewith a credit counter and the at least one row of memory units having associated therewith a reception scheduler having inputs coupled to outputs of the credit counters, said reception scheduler having an output providing the flow control information based at least on the outputs of the credit counters,
where credits are prioritized using one of a highest memory occupancy first (HMF) procedure intended to maintain as active existing flows or by using a highest memory vacancy first (HVF) procedure intended to support flows that make forward progress at the switch level.

17. The switching device of claim 16, further comprising a memory occupancy counter having an output coupled to said reception scheduler, where the flow control information is also based on the memory occupancy counter, and where the flow control information comprises information to specify a memory unit to store a data packet.

* * * * *